United States Patent
Yoshinaga

(10) Patent No.: US 7,397,159 B2
(45) Date of Patent: Jul. 8, 2008

(54) ROTARY ELECTRIC APPARATUS WITH SKEW ARRANGEMENT

(75) Inventor: Soichi Yoshinaga, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/039,823

(22) Filed: Jan. 24, 2005

(65) Prior Publication Data

US 2005/0179334 A1    Aug. 18, 2005

(30) Foreign Application Priority Data

Jan. 23, 2004    (JP) .............................. 2004-016346

(51) Int. Cl.
- *H02K 1/27* (2006.01)
- *H02K 21/14* (2006.01)
- *H02K 1/17* (2006.01)

(52) U.S. Cl. .................. 310/156.47; 310/112; 310/254; 310/263

(58) Field of Classification Search ............ 310/156.47, 310/112, 254, 263
See application file for complete search history.

(56) References Cited

U.S. PATENT DOCUMENTS

| | | | |
|---|---|---|---|
| 5,355,044 A | 10/1994 | Uchida et al. | |
| 5,760,520 A | 6/1998 | Hasebe et al. | |
| 5,903,080 A * | 5/1999 | Nashiki et al. | 310/168 |
| 5,973,426 A * | 10/1999 | Fujinaka et al. | 310/49 R |
| 6,104,117 A * | 8/2000 | Nakamura et al. | 310/254 |
| 6,121,706 A * | 9/2000 | Nashiki et al. | 310/168 |
| 6,144,132 A * | 11/2000 | Nashiki | 310/156.55 |
| 6,211,593 B1 * | 4/2001 | Nashiki | 310/156.33 |
| 6,788,013 B2 * | 9/2004 | Islam et al. | 318/432 |
| 6,847,150 B2 * | 1/2005 | Kometani et al. | 310/263 |
| 6,853,105 B2 * | 2/2005 | Nakano et al. | 310/156.47 |
| 6,867,524 B2 * | 3/2005 | Liang | 310/156.47 |
| 6,940,198 B2 * | 9/2005 | Ionel et al. | 310/156.47 |
| 2002/0047431 A1 * | 4/2002 | Fukushima | 310/156.47 |
| 2004/0124728 A1 * | 7/2004 | Yamaguchi et al. | 310/156.25 |

FOREIGN PATENT DOCUMENTS

| | | | |
|---|---|---|---|
| JP | 08-251847 | * | 9/1996 |
| JP | A 09-182387 | | 7/1997 |
| JP | B2 2672178 | | 7/1997 |
| JP | B2 3028669 | | 2/2000 |
| JP | A 2003-284276 | | 10/2003 |

OTHER PUBLICATIONS

Machine Translation of "Detailed Description" section of Mitsuboshi JP 08-251847, Sep. 1996.*

* cited by examiner

*Primary Examiner*—Burton Mullins
(74) *Attorney, Agent, or Firm*—Oliff & Berridge, PLC

(57) ABSTRACT

A rotary electric apparatus comprises a rotor including a first and second rotor members, a stator including a first stator and second stator members with armature coils to which armature current is supplied for synchronous rotation. The first and second rotor members are formed into a skewed type. Control means for controlling amounts Φ1 and Φ2 of field magnetic flux generated by the first and second rotor members, respectively, such that the amounts Φ1 and Φ2 differ from each other to reduce a difference between a maximum amplitude of a predetermined-order harmonic component F1 of an electromagnetic force caused by a pair of the first rotor member and the first stator member and a maximum amplitude of the predetermined-order harmonic component F2 of an electromagnetic force caused by a further pair of the second rotor member and the second stator member is reduced.

10 Claims, 9 Drawing Sheets

ROTARY ELECTRIC APPARATUS WITH SKEW ARRANGEMENT

CROSS REFERENCES TO RELATED APPLICATIONS

The present application relates to and incorporates by reference Japanese Patent application No. 2004-16346 filed on Jan. 23, 2004.

BACKGROUND OF THE INVENTION

1. Field of the Invention

The present invention relates to a rotary electric apparatus, such as DC brushless motor and three-phase AC motor generator, which is generally called "synchronous machine," and, in particular to the rotary electric apparatus which has an improved ability to reduce the ripples of torque that are generated and also reduce the noise (called "magnetic noise") caused by pulsated drive current.

2. Description of the Related Art

A various types of rotary electric apparatuses have now been used, one type of which is proposed by (i) Japanese Patent publication No. 2672178, (ii) Japanese Patent publication No. 3028669, (iii) Japanese Patent Laid-open publication No. 9-182387, and (iv) Japanese Patent Laid-open publication No. 2003-284276.

Of these, the publications (i) to (iii) provide a skew structure arranged in a motor, in which even rotor members, each consisting of a magnetic rotor, are secured on a rotary shaft in a mutually adjacent manner such that the rotor members are shifted from each other along the rotary shaft by an angle corresponding to a half wavelength of a torque harmonic component of a predetermined order. Further, the forgoing publication (iv) also provides a motor provided with a rotor of skew arrangement type mentioned above, wherein a nonmagnetic member is inserted between mutually adjacent rotor members.

In the foregoing skewed rotary electric apparatus, a practical example can be provided such that the rotor members are skewed by an angle that corresponds to a half wavelength of a torque harmonic component of, for example, the sixth order (in the case of the three-phase type). This skew arrangement allows the torque harmonic component of this order to be opposite in phase between a first rotor part and a second rotor part. This skew arrangement aims at canceling the torque harmonic components from the two rotor parts.

However, it has been pointed out that such conventional skew arrangement structures are insufficient for canceling the torque harmonic components.

SUMMARY OF THE INVENTION

In light of the foregoing circumstances, the present invention has been made and an object of the present invention is to provide a rotary electric apparatus capable of canceling a harmonic component of torque (i.e., electromagnetic force) more than the conventional, so that ripples of torque and noise (magnetic noise) caused on account of the harmonic component are reduced largely.

In order to realize the above object, as one aspect, the present invention provides a rotary electric apparatus, comprising: a rotation shaft having an axial direction; a rotor including both a first rotor member and a second rotor member each generating magnetic flux providing a field and being secured on the rotation shaft along the axial direction thereof; a stator facing the rotor with a predetermined-size air gap therebetween and including both a first stator member and a second stator member with armature coils through which armature current is supplied for synchronous rotation between the rotor and the stator; a skewing structure skewing a first phase angle $\theta 1$ of the magnetic flux generated by the first rotor member from a phase angle $\theta 2$ of the magnetic flux generated by the second rotor member, both the first phase angle $\theta 1$ and the second phase angle $\theta 2$ being based on a reference angular position of the rotor providing a maximum of a zero-th component of torque caused in response to the armature current to be supplied in the stator; and control means for controlling an amount $\Phi 1$ of the magnetic flux generated by the first rotor member and an amount $\Phi 2$ of the magnetic flux generated by the second rotor member such that the amounts $\Phi 1$ and $\Phi 2$ differ from each other to reduce a difference between a maximum amplitude of a predetermined-order harmonic component F1 of an electromagnetic force caused by a pair consisting of the first rotor member and the first stator member and a maximum amplitude of the predetermined-order harmonic component F2 of an electromagnetic force caused by a further pair consisting of the second rotor member and the second stator member is reduced.

As modifications, the first or second rotor member may be divided into plural portions with the second or first rotor member therebetween.

In the present embodiment, the "amount of field magnetic flux" is referred to as an amount of magnetic flux interlinking armature coils of a stator Thus, in the rotary electric apparatus with a skew arrangement in which, for example, the field poles of a plurality of rotor members are arranged with a predetermined angular shift in the circumferential direction of the rotor, amounts of field magnetic flux generated by, for example, the plural rotor members are made different from each other (i.e., adjusted every rotor member). Adjusting the amounts of field magnetic flux makes it possible, with compensating the skew arrangement, that a harmonic component of torque generated in response to the amount of the field magnetic flux is reduced. It is therefore possible to lower ripples in the torque and magnetic oscillation in an improved manner, thus providing a synchronous machine.

The principle of the present invention will now be detailed by making a comparison with a conventional skewed rotary apparatus.

In the conventional skewed rotary electric apparatus, there has been a technique called "angular skew," with which the vectors of torque harmonic components originated from two rotor members are made opposite in their phases to each other (that is, an electrical angle of 180 degrees exists between both the phases) to reduce such torque harmonic components. Employing such a skew arrangement will cause field magnetic pole vectors at those two rotor members to have mutually different angles to the vector of current flowing through armature windings. Hence, depending on the difference between the angles, the amplitude of torque, i.e., the maximum amplitude itself changes. The conventional skewing technique will lead to a difference between torque harmonic components (DC component on the "dq" axes) at the maximum amplitudes emanating from the two rotor members. This means that, even the conventional skew arrangement is employed for canceling torque harmonic components of a predetermined order, it is impossible to sufficiently cancel those torque harmonic components.

In consideration of this drawback, the present invention adopts, in addition to the skew arrangement described above, a technique for changing (or adjusting) amounts of magnetic flux generated by the two rotor members, as described. Hence, the fact that torque (that is, corresponding to an electromagnetic force) changes substantially in conformity with a product between armature current and an amount of field magnetic flux is introduced to have a difference between the amounts of field magnetic flux from the two rotor members. This difference is used to make maximum amplitudes of the torque predetermined-order harmonic components agree with each other. As a result, compared to the conventional skewed rotary electric apparatus, in which the axial lengths of the two rotor members are the same, the torque harmonic components can be cancelled out with higher precision, realizing a synchronous type of rotary electric apparatus with fewer ripples in the entire torque and less magnetic noise.

Additionally, it has been considered that a magnetic noise is caused, as one reason, due to vibration of the teeth of the stator members to which a circumferential force is applied as a reaction of a torque harmonic component to be applied to the rotor members.

As another aspect, the present invention provides an electric apparatus, comprising: a rotation shaft having an axial direction; a rotor including both a first rotor member and a second rotor member each generating magnetic flux providing a field and being secured on the rotation shaft along the axial direction thereof; a stator facing the rotor with a predetermined-size air gap therebetween and including both a first stator member and a second stator member with armature coils through which armature current is supplied for synchronous rotation between the rotor and the stator; and a current controller controlling the armature current, wherein either the rotor or stator is subjected to a skew arrangement in which a first phase angle $\theta 1$ of the magnetic flux generated by the first rotor member is skewed from a phase angle $\theta 2$ of the magnetic flux generated by the second rotor member, both the first phase angle $\theta 1$ and the second phase angle $\theta 2$ being based on a reference angular position of the rotor providing a maximum of a zero-th component of torque caused in response to the armature current to be supplied in the stator, and wherein the current controller is configured to control the armature current such that, in cases where it is assumed that a phase angle of either the first or second rotor member measured at an amount of the armature current at which torque becomes a maximum thereof is zero, a phase angle $\theta 1$ of the magnetic flux generated by the first rotor member has a negative value thereof and a phase angle $\theta 2$ of the magnetic flux generated by the second rotor member has a positive value thereof.

Accordingly, the shifts of the phase angles at both the rotor members, which are measured from the phase angle of zero at which the torque zero-th component shows its maximum, can be reduced, so that variations in torque of both the rotors, which are also measured on the phase angle of zero, can be lessened, thus suppressing the reduction in the effective torque.

DETAILED DESCRIPTION OF THE PREFERRED EMBODIMENTS

With reference accompanying drawings, various embodiments of the present invention will now be described.

First Embodiment

Referring to FIGS. 1 to 4, a first embodiment of the rotary electric apparatus according to the present invention will now be described.

Figure 1:
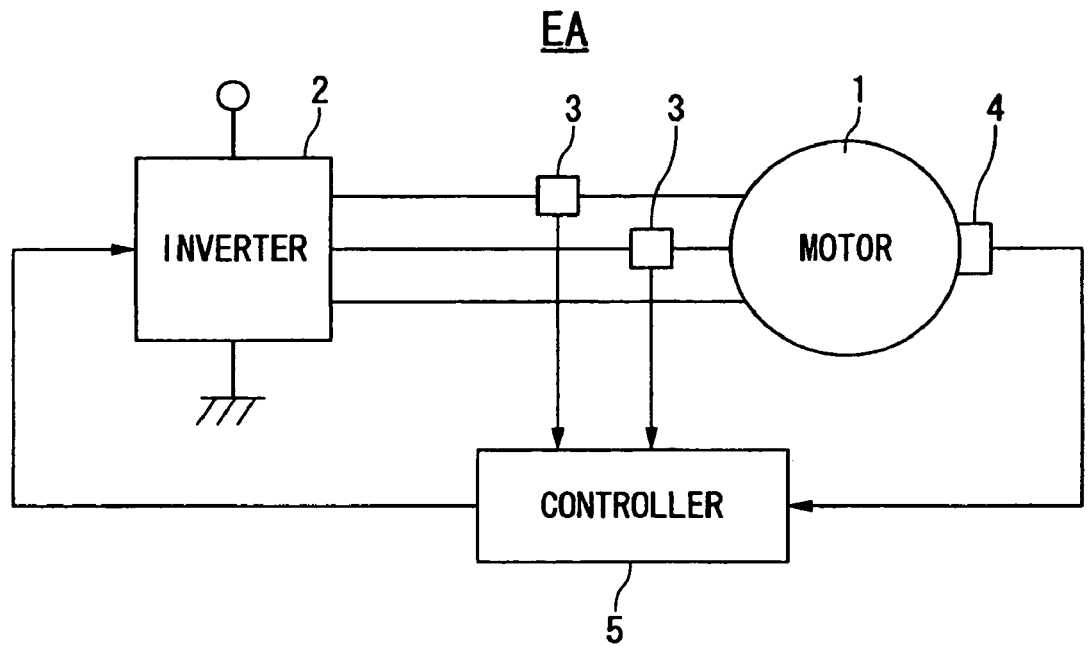
FIG. 1 is a block diagram outlining the configuration of an electric apparatus in which an IPM type of synchronous machine serving as the rotary electronic apparatus according to the present invention is incorporated.

FIG. 1 schematically outlines the electrical configuration of an electric apparatus EA in which a synchronous machine 1 serving as the rotary electric apparatus according to the present invention is incorporated. In the present invention, the synchronous machine 1 is of a magnetic rotor (usually called "IPM (Interior Permanent Magnet)" type of machine and, by way of example, is composed of a brushless DC (direct current) motor of IPM type, but this is not a definitive list.

This electronic apparatus EA is provided with, in addition to the IPM type of synchronous machine 1, an inverter 2, current sensors 3, a rotation angle sensor 4, and a controller 5. The elements 2-5 constitute the armature current controller for the synchronous machine 1.

The inverter 2 is in charge of converting DC (direct current) power, which is supplied by a not-shown DC power supply, to three-phase power. For the conversion, known six switching elements are incorporated in the inverter 2. The controller 5 operates to control the six switching elements in an on/off manner (i.e., using a PWM (pulse width modulation) technique) in the inverter 2 on the basis of signals detected by the current sensor 3 and rotation angle sensor 5. Since this kind of electric apparatus EA including the synchronous machine 1, such as brushless DC motor, has been well known, more explanations about the drive circuit itself will be omitted here.

Figure 2:
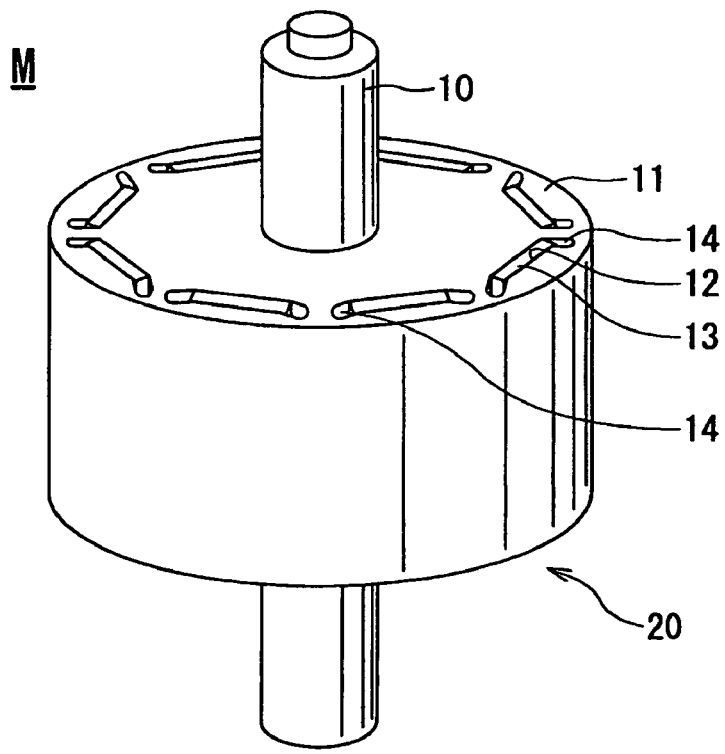
FIG. 2 is a perspective view pictorially showing the IPM type of rotor according to a first embodiment of the present invention.

In connection with in FIGS. 2 and 3, the IPM type of synchronous machine 1 will now be explained, which has a rotor/stator structure M shown therein.

The rotor/stator structure M will first be explained about a rotor 20, which includes a rotor shaft 10, on which a rotor core 11 composed of layered electromagnetic steel sheets is securely fitted. Even pieces of magnet accommodating holes 12 are formed through longitudinally along the axial direction of the rotor core 11 to be located at given positions near to the outer surface. In the magnet accommodating holes 12, flat type magnets 13 are fixedly inserted and accommodated. Each of the magnets 13 have two main surfaces each having the widest area and is magnetized such that the main surfaces become magnetic pole surfaces. And the magnetic pole surfaces oriented to the outer surface of the rotor core 11 are polarized alternately between adjacent ones. Furthermore, short-circuit preventing holes 14 are formed to extend from both ends of each magnet accommodating hole 12 toward the outer surface of the rotor core 11. Thus those holes 14 prevents magnetic flux from the magnets 13 from being short-circuited within the rotor core 11.

Figure 3:
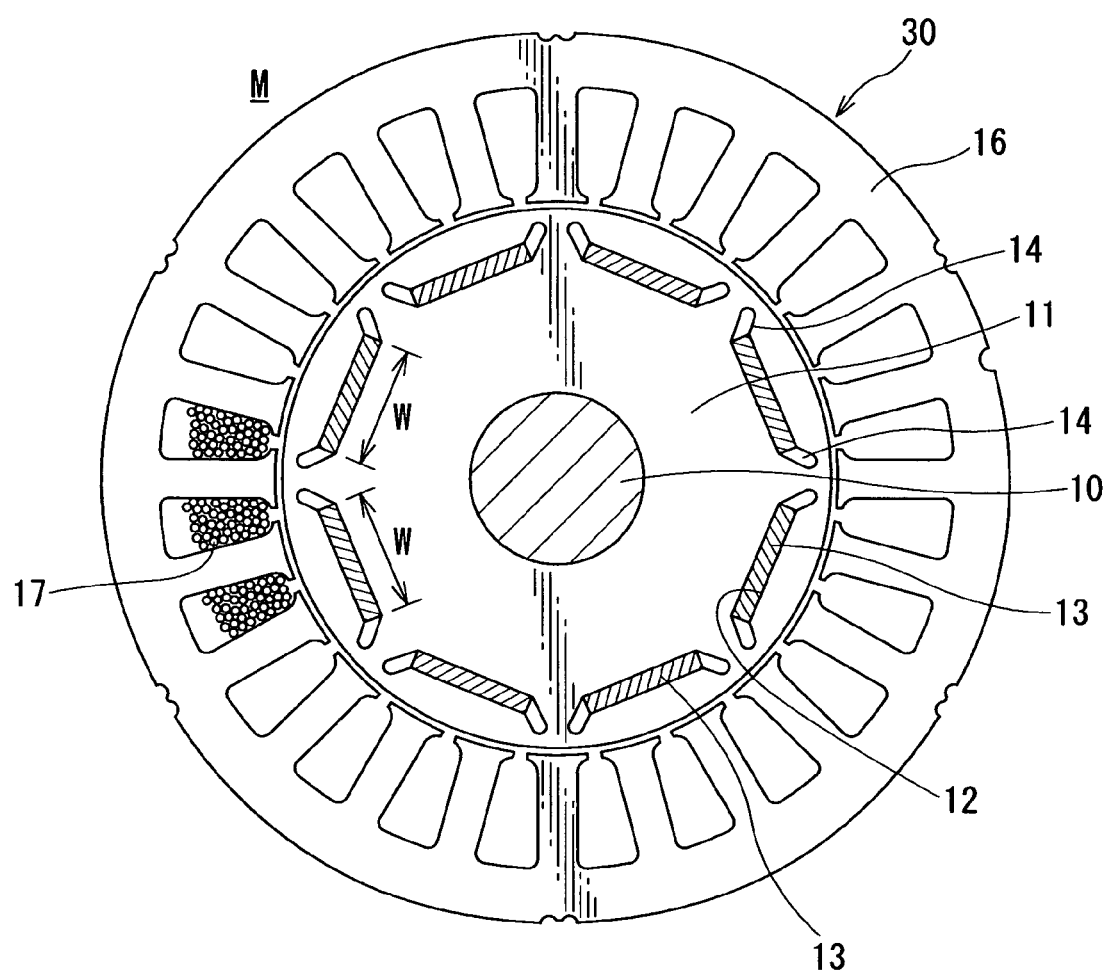
FIG. 3 is a section of the IPM type of rotor shown in FIG. 2.

As shown in FIG. 3, the rotor core 11 is placed in the bore of an approximately cylindrical stator 30 secured by a not-shown housing, in such a manner that the outer surface of the rotor core 11 faces the inner surface of the stator 30 with a slight air gap left therebetween. The stator 30 is equipped with a stator core 16 composed of layered electrometric steel sheets, which provides the above inner surface at a radially inner position, and three-phase armature coils 17 accommodated in slots formed through the stator core 16 to open to the inner surface. The armature coils 17 are powered by the inverter 2.

This rotor/stator structure M of the IPM type of synchronous machine 1 has also been known well, so that no more explanations will be given.

Figure 4:
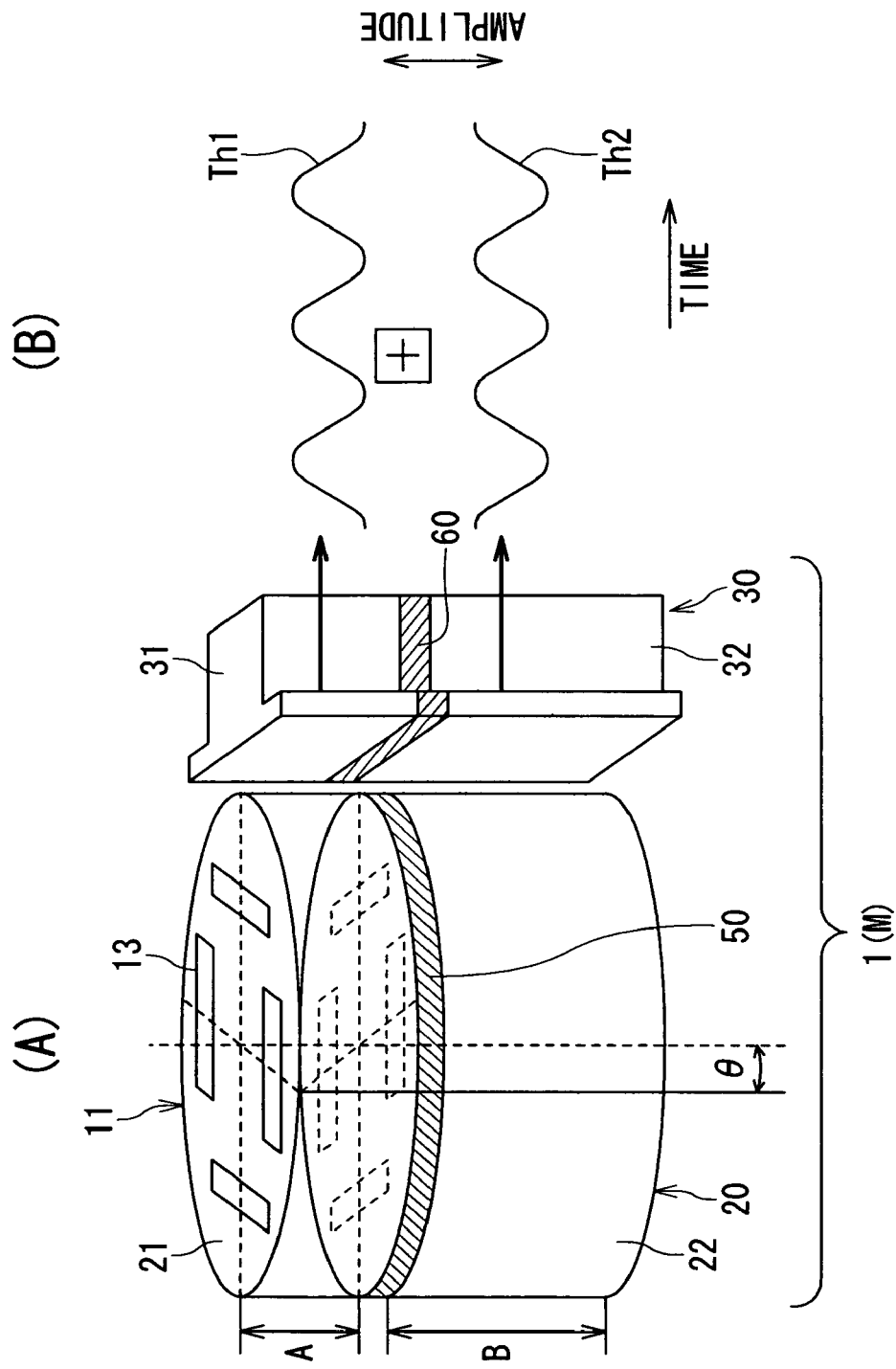
FIG. 4(A) shows a perspective view pictorially of the IPM type of rotor, together with a stator conceptually depicted, of the synchronous machine according to the first embodiment of the present invention.
FIG. 4(B) shows waveforms to be output from the stator.

Referring to FIG. 4, of the foregoing rotor/stator structure M, an essential part according to the present embodiment will now be detailed.

FIG. 4(A) pictorially illustrates a perspective view of the IPM type of rotor/stator structure M of the synchronous machine 1 according to the present embodiment. The rotor/stator structure M is subjected to some deformation about some factors including the number of magnet accommodating holes 12 and magnets 13 and arrangement thereof and the shape of the stator 30. FIG. 4(B) shows waveforms of a harmonic component of torque originated from an electromagnetic force caused in the synchronous machine 1.

This synchronous machine 1 is provided with, as described above, the IPM type of rotor 20 and the stator 30, which are characterized in that the rotor 20 is physically sectioned into a first and second rotor members and the stator 30 is also physically sectioned into a first and second stator members 31 and 32.

In the first and second rotor members 21 and 22, like the conventional, the first rotor member 21 is skewed a predetermined phase angle θ (i.e. skew angle) from the second rotor member 22 in the circumferential direction. In addition, the first rotor member 21 is formed to be shorter in axial length than the second rotor member 22 by an amount defined by a predetermined ratio described later.

Meanwhile, both the first and second stator members 31 and 32 depend on the axial lengths of the first and second rotor members 21 and 22. That is, the first stator member 31 is defined to be a portion of the stator 30, which faces the first rotor member 21 and the second stator member 32 is defined to be a portion of the stator, which faces the second rotor member 22. However, both the first and second stator members 31 and 32 are structured by the same body, with no skew portions therebetween.

The skew angle θ is decided such that, as shown in FIG. 4(B), there are caused mutually opposite phases between a predetermined-order harmonic component of torque to be generated by a first member pair consisting of the first stator member 31 and the first rotor member 21 and the predetermined-order harmonic component of torque to be generated by a second member pair consisting of the second stator member 32 and the second rotor member 22. In this embodiment, the predetermined order is the sixth order, so that the sixth-order harmonic components of torque (hereinafter referred to as the sixth-order torque harmonic components) between the first and second member pairs are given a shift of electrical angles of π. The order of the torque to be targeted is not limited to the sixth order.

Incidentally, in FIG. 4(B), references Th1 and Th2 denote the waveforms of torque at the first rotor member 21 and the second rotor member 22, respectively. The phases between both the waveforms are opposed to each other.

The torque is generated in proportion to an amount of magnetic flux to be applied as a magnetic field (i.e., field magnetic flux) by the rotor members of each member pair. The amount of field magnetic flux is almost in proportion to a magnetically exciting force to the stator. A circumferential component of the magnetically exciting force results in torque for the rotation, while a radial component thereof will lead to magnetic noise.

Furthermore, the ratio between the axial lengths of the first and second rotor members 21 and 22 is defined to satisfy the condition that a maximum amplitude of the sixth-order torque harmonic component to be generated from the first rotor member 21 is equal to that to be generated from the second rotor member 22. As described, it can be assumed that the torque is essentially proportional to an amount of field magnetic flux to be applied by each rotor member. Hence, if an assumption is made such that both the first rotor member 21 and the second rotor member 22 are equal to each other in their axial lengths and the sixth-order torque harmonic component from the first rotor member 21 has a maximum amplitude of "B" and the sixth-order torque harmonic component from the second rotor member 22 has a maximum amplitude of "A," the axial length of the first rotor member 21 can be decided as "A" and the axial length of the second rotor member 22 can be decided as "B," respectively.

There is no structural difference between the first and second rotor members 21 and 22 besides the skew arrangement defined by the skew angle θ and the difference between their axial lengths.

Further, as shown in FIG. 4(A), a plate-like nonmagnetic spacer 50 is inserted between the first and second rotor members 21 and 22 to mutually connect the members 21 and 22 and a plate-like nonmagnetic spacer 60 is inserted between the first and second stator members 31 and 32 to mutually connect the members 31 and 32. These spacers 50 and 60 serve as magnetically divided regions between the first member pair and the second member pair, whereby undesirable magnetic flow (leakage) between the first and second member pairs can be suppressed to a large extent. It is desirable to produce the spacers 50 and 60 to have the same shapes as those of the members 21, 22 and 31 and 32, but this is not a definitive list. Spacers of any shapes can be adopted. In addition, in place of such nonmagnetic spacers, a simple air gap may be formed between the pairs.

The above-descried structure thus makes it possible to establish the condition that the sixth-order torque harmonic components emanating respectively from the first and second rotor members 21 and 22 provides waveforms whose maximum amplitudes are equal to each other and whose phases are opposite to each other. Thus, in terms of at least a theoretical aspect, the six-order torque harmonic components from both pairs are canceled out as a whole of the rotor and stator 20 and 30, which will reduce largely both ripples of the torque and magnetic noise, which result from the sixth-order torque harmonic component.

Modifications in the First Embodiment

Various modifications which can be adopted in the first embodiment will now be explained. For the sake of simplified explanations, in the modifications, the components of this machine which are identical or similar to those in the foregoing first embodiment will be given the same reference numerals as those in the first embodiment, whereby the redundant explanations are omitted or shortened. In addition, in the followings, the nonmagnetic spacers 50 and 60, which are inserted between the first and second rotor members and between the first and second stator members, are omitted from being depicted.

First Modification

A first modification relates to the order of a harmonic component of torque caused between the rotor and stator member. This order will not be confined to the sixth order, but any other orders are to be targeted for the cancellation of their harmonic components.

Second Modification

Figure 5:
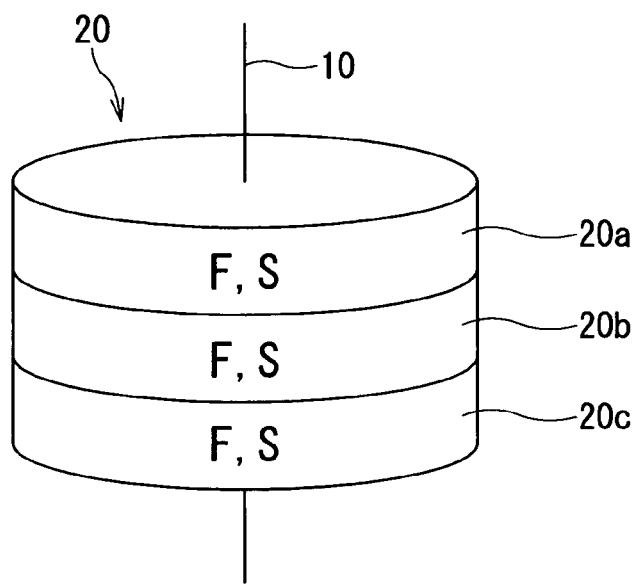
FIG. 5 is an illustration outlining the structure of rotors according to a modification.

A second modification is depicted in FIG. 5. In this modification, the rotor 20 is formed by, for example, three groups of segments 20a, 20b and 20c, in which each segment group 20a (20b, 20c) is composed of the first member pair "F" consisting of the first rotor member 21 and the first stator member 31 and the second member pair "S" consisting of the second rotor member 22 and the second stator member 32. Each of the members 21, 22, 31 and 32 is identical to that described in FIG. 4(A). These three groups of segments 20a, 20b and 20c are mounted on the rotation shaft 10 in the axial direction thereof in a mutually juxtaposed manner.

This manner of arrangement is effective in reducing variations of torque (i.e., unbalance of torque) generated between each rotor/stator member pair disposed along the axial direction of the rotation shaft 10, because the first and second rotor members 21 and 22, which produce mutually different amounts of torque with the aid of the first and second stator members 31 and 32, are dispersed in the axial direction.

Third Modification

Figure 6:
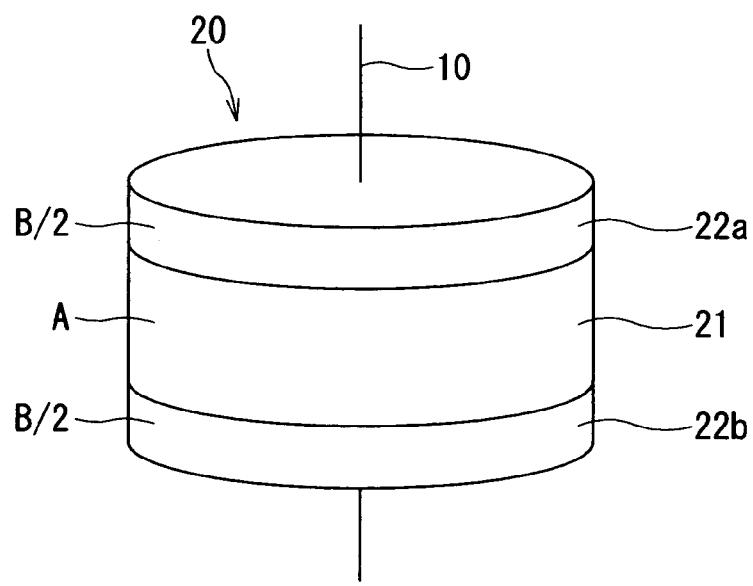
FIG. 6 is an illustration outlining the structure of rotors according to another modification.

A third modification is shown in FIG. 6, in which the second rotor member 22, which is described in FIG. 4(A), is divided into two member portions 22a and 22b whose axial lengths are equal to each other. Further, those two member portions 22a and 22b are disposed on the rotation shaft so as to interleave the first rotor member 21 between the two member portions 22a and 22b. This divisional structure of the second rotor member 22, which produces an amount of torque different from that from the first rotor member 21, is useful for reducing variations (unbalance) of the torque along the axial direction of the rotation shaft 10.

Fourth Modification

Figure 7:
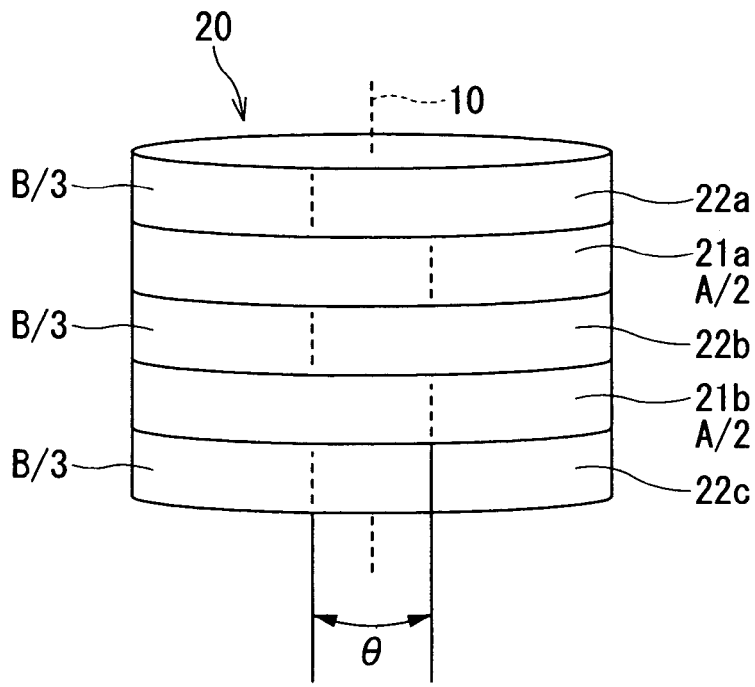
FIG. 7 is an illustration outlining the structure of rotors according to another modification.

A fourth modification is illustrated in FIG. 7. In this modified rotor 20, the second rotor member 22, which is described in FIG. 4(A), is divided into three member portions 22a, 22b and 22c whose axial lengths are equal to each other, whilst the first rotor member 21, which is also described in FIG. 4(A), is divided into two member portions 21a and 21b whose axial lengths are equal to each other. For example, the member portions 21a, 21b, 22a and 22b are all the same in their axial lengths.

Moreover, those member portions 22a to 22c and 21a and 21b are alternately arranged in the axial direction on the rotation shaft 10. Like the foregoing second and third modifications, this rotor structure makes it possible to reduce variations of the torque generated along the axial direction between the rotor member 20 and the stator member 30.

In the first embodiment, as will be described later, it is ideal that the ratio of the axial lengths "A" and "B" is set to $A:B=0.38:0.62≈2:3$.

From this point of view, dividing the whole axial length of the rotor 20 into five portions (five member portions) and arranging those five member portions alternatively along the axial direction, as exemplified in the above fourth modification, is one of the ideal modes for the rotor structure. Accordingly, it is possible to cancel the sixth-order torque harmonic component in an approximately ideal manner. A further advantage provided by the fourth embodiment is that it is sufficient to prepare only one type of magnet (rotor member) which can be used in common as the member portions of the first and second rotor members 21 and 22. This advantage leads to a reduction in the number of parts necessary for the rotor 20. A decrease in core loss of the magnets, which is resultant from the division of the magnets, is given as well.

Fifth Modification

Figure 8:
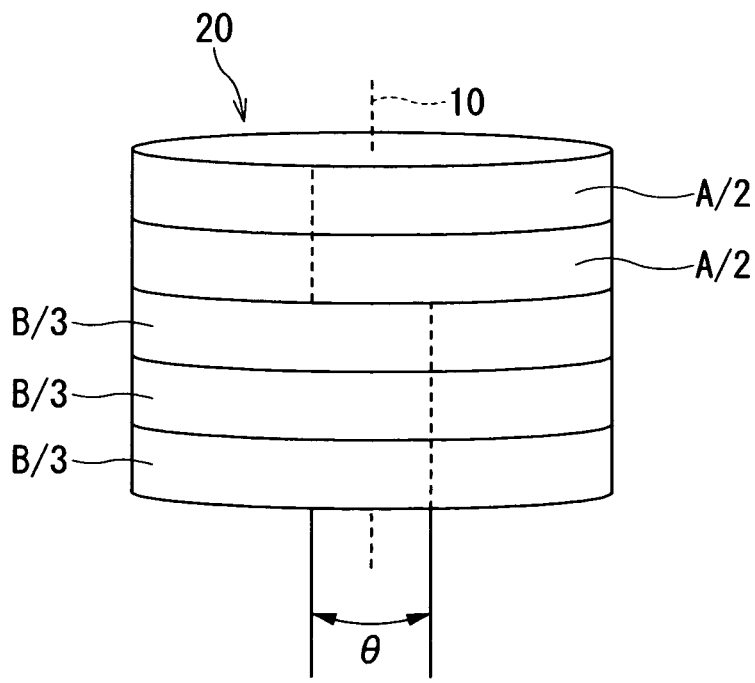
FIG. 8 is an illustration outlining the structure of rotors according to another modification.

A fifth modification can be explained with reference to FIG. 8, which is further modified from the rotor structure shown in the fourth modification (refer to FIG. 7). The first and second rotor members 21 and 22 are sectioned respectively into two member portions and three member portions, in total, five member portions, in the same fashion as that in FIG. 7. However, a difference is that those five member portions are serially arranged in the order of the first and second rotor members in the axial direction, not alternatively between the first and second rotor members. This also enjoys a decrease in core loss of the magnets, thanks to the division of the magnets.

Experimental Results

Results of experiments conducted by the inventor will now be described together with various advantages associated with the experimental results. The experiment was conducted by the inventor on the conditions in which the IPM type of synchronous machine with 8 poles and 24 slots, which are shown in FIGS. 2 and 3, employs the skew arrangement shown in FIG. 4(A).

Figure 9:
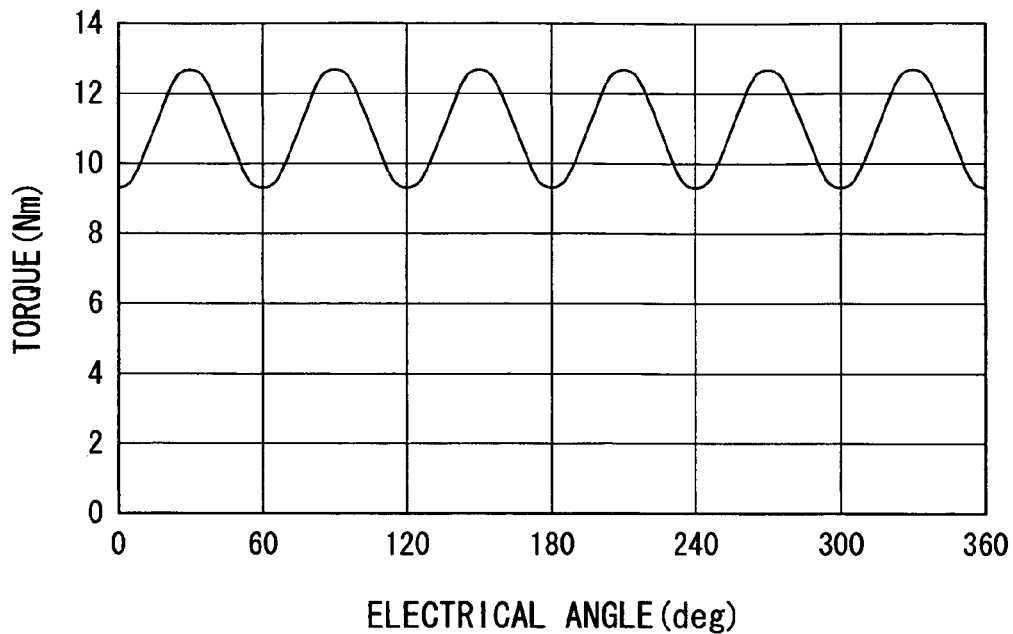
FIG. 9 shows a torque waveform obtained from a reference product to which the IPM type of rotor is applied.
Figure 10:
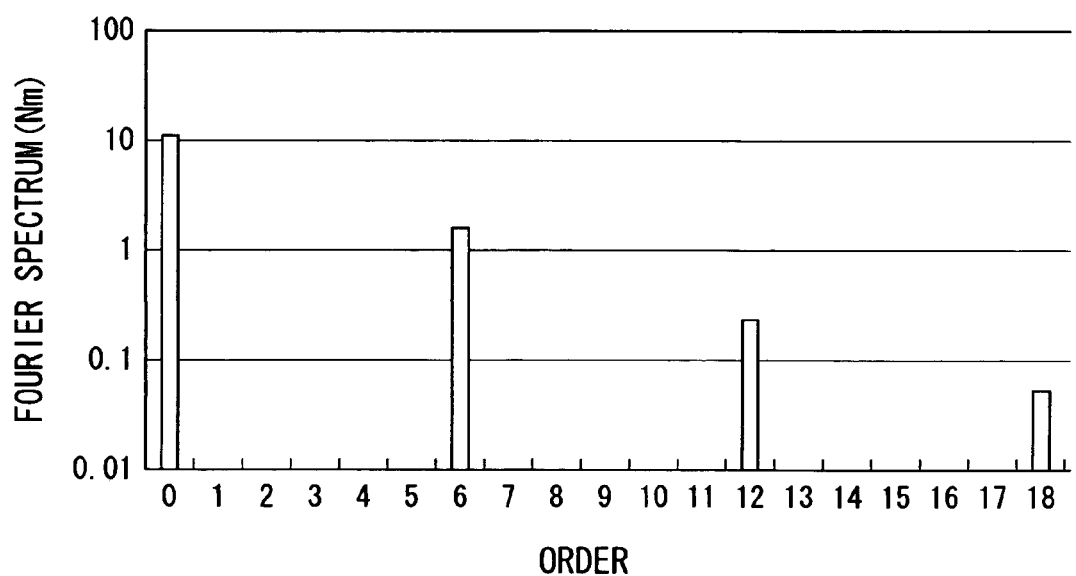
FIG. 10 is a Fourier spectrum of the torque waveform shown in FIG. 9.

The inventor's experiments include an evaluation for an IPM structure with no skew arrangement (the inventor call it as "reference product"), which was operated on a current of 70 A of which phase is 120 deg. (a reference is the d-axis). This evaluation provides a torque waveform shown in FIG. 9 and a Fourier spectrum thereof shown in FIG. 10. FIG. 10 reveals that, of all harmonic component of torque caused between the rotor member and the stator member, the sixth-order harmonic component is considerably larger than the remaining harmonic components. By the way, the zero-th component means a DC component, i.e., an even torque.

Figure 11:
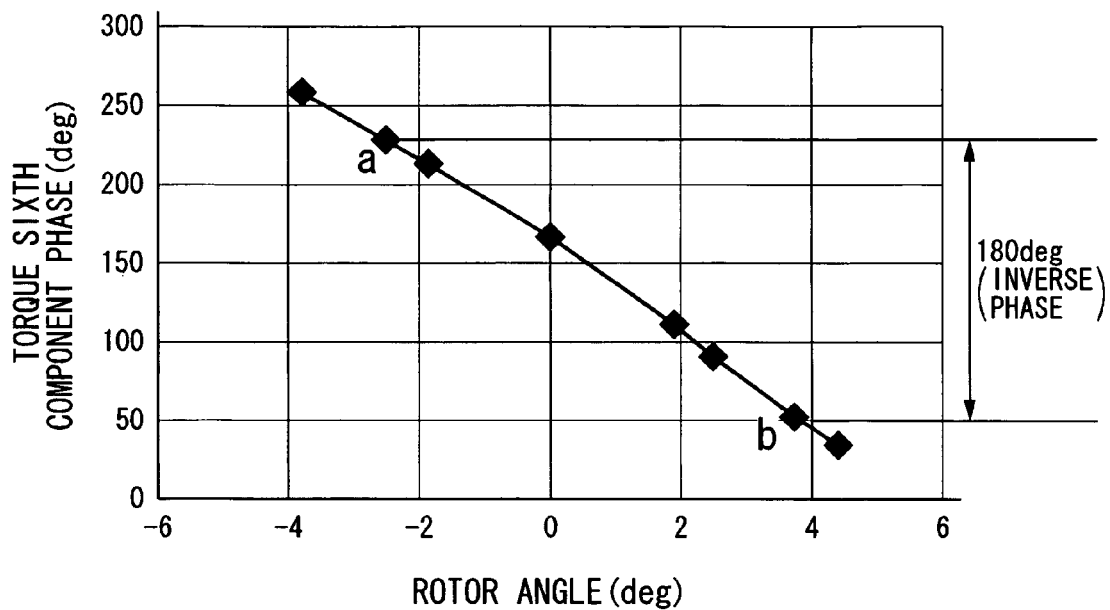
FIG. 11 is a graph showing the relationship between the phases of the sixth-order torque harmonic component and the rotor angular positions.
Figure 12:
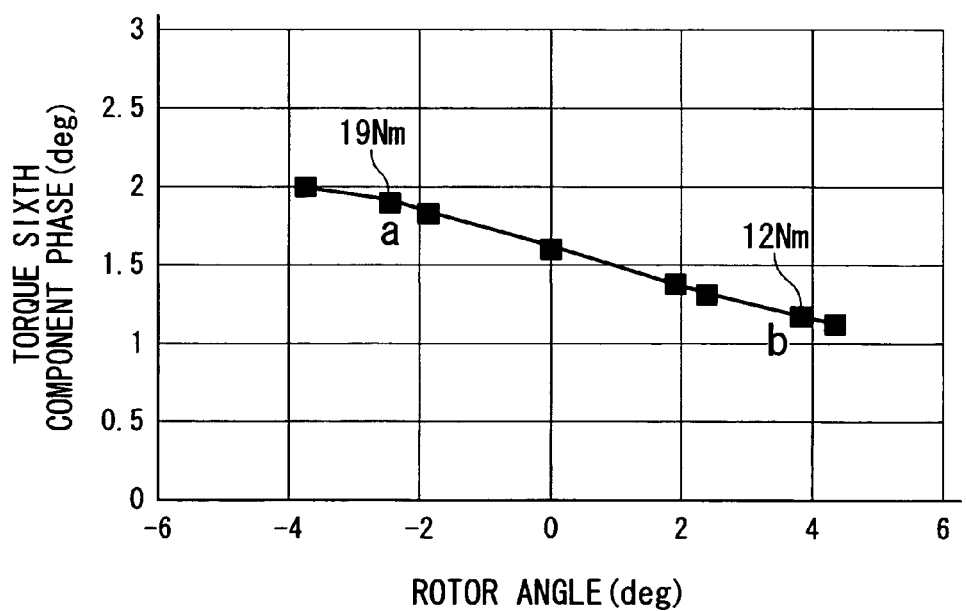
FIG. 12 is a graph showing the relationship between the amplitudes of the sixth-order torque harmonic component and the rotor angular positions.

In connection with FIGS. 11 and 12, the above sixth-order harmonic component of the torque will now be detailed with respect to its amplitude and phase. FIG. 11 shows the relationship between rotor angles (horizontal axis) and phase angles computed on the basis of a given electrical angle of the sixth-order torque harmonic component waveform, the given electrical angle position is made reference as being zero (vertical axis). On the curve shown in FIG. 11, when the angular position of the first rotor member 21 is set to a position "a (=−2.5 degrees)," it is understood that the angular position of the second rotor member 22 should be located at a potion "b (=+3.75 degrees)."

Meanwhile FIG. 12 shows the relationship between rotor angles (horizontal axis) and maximum amplitudes of the torque sixth-order harmonic component (vertical axis). The rotor angles cited in this FIG. 12 are evaluated such that a rotor angle at a maximum of the torque zero-th order component (or even torque) is set to zero and rotor angles that delay or advance from the zero angle are set to be negative and positive, respectively. In other words, the rotor angle "zero" is made equal to a phase angle "zero" according to the present invention.

FIG. 12 explains that, in cases where an amount of field magnetic flux is the same, in other words, the rotor members are equal in their axial lengths to each other, the first rotor member 21 operating at the point "a" on the curve generates a maximum amplitude of the sixth-order torque harmonic component which is double compared to that generated by the second rotor member 22 operating at the point "b" on the curve. Precisely, the maximum amplitude from the first rotor member 21 is 1.9 Nm, while that from the second rotor member 22 is 1.2 Nm. From this fact, the layered thicknesses, that is, the axial lengths A and B of the rotor cores (refer to FIG. 4(A)) are decided to be $$A:B = 1.2/(1.9+1.2):1.9/(1.9+1.2)$$
$$= 0.38:0.62$$
$$\cong 2:3,$$

so that, in terms of a theoretical analysis, the sixth-order torque harmonic component can completely be canceled out. The points "a" and "b" should be located on the curve so as to meet a condition that reductions in the output and operation efficiency keep their minimums.

Figure 13:
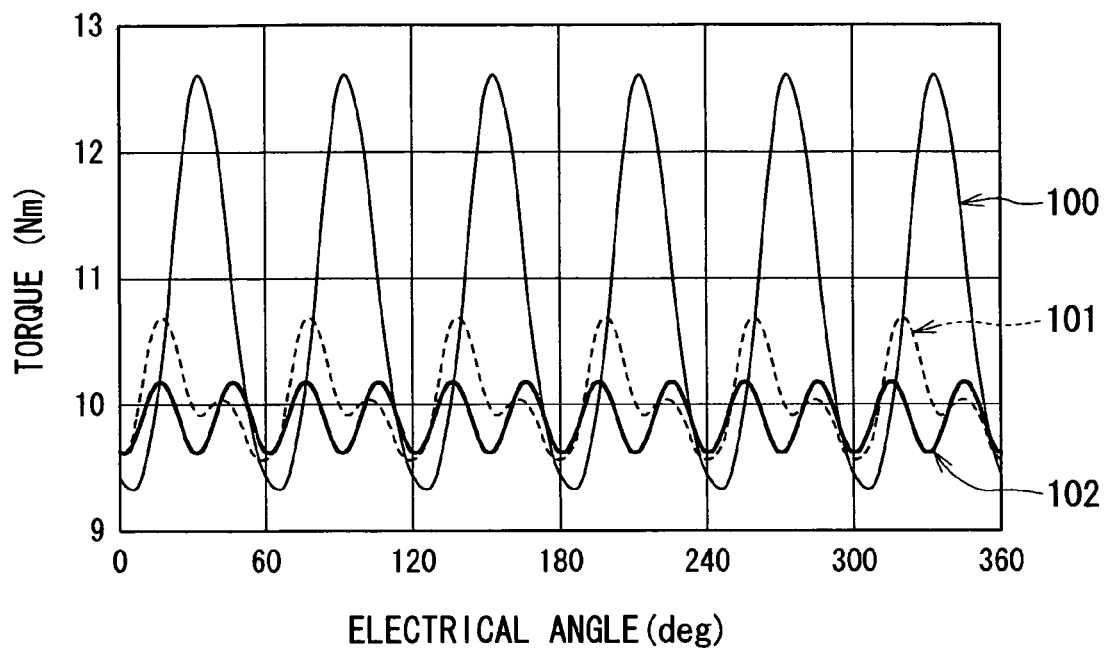
FIG. 13 shows various torque waveforms obtained from various types of synchronous machines with IPM type of rotors.

FIG. 13 shows in a comparative way various torque waveforms measured with respect to the electrical angles in a comparative way. Of these, the waveforms are composed of torque waveform 100, 101 and 102. The waveform 100 shows periodical changes in the torque generated in the foregoing reference IPM type of synchronous machine (reference product). The torque waveform 101 illustrates periodical changes in the torque generated in a conventional IPM type of synchronous machine (conventional skewed product) in which the skew arrangement is adopted, but the axial lengths of the first and second rotors are still equal to each other. The torque waveform 102 shows periodical changes in the torque generated in an IPM type of synchronous machine according to the present embodiment (embodiment product) that employs the skew arrangement as well as the first and second rotor members 21 and 22 whose axial lengths are mutually adjusted (i.e., made different from each other) to have the rotors 21 and 22 respectively subjected to mutually-adjusted equal amounts of magnetic flux for the fields thereof. The waveform 102 obviously shows that employing the configurations according to the present embodiment makes it possible to considerably reduce the torque harmonic component.

Figure 14:
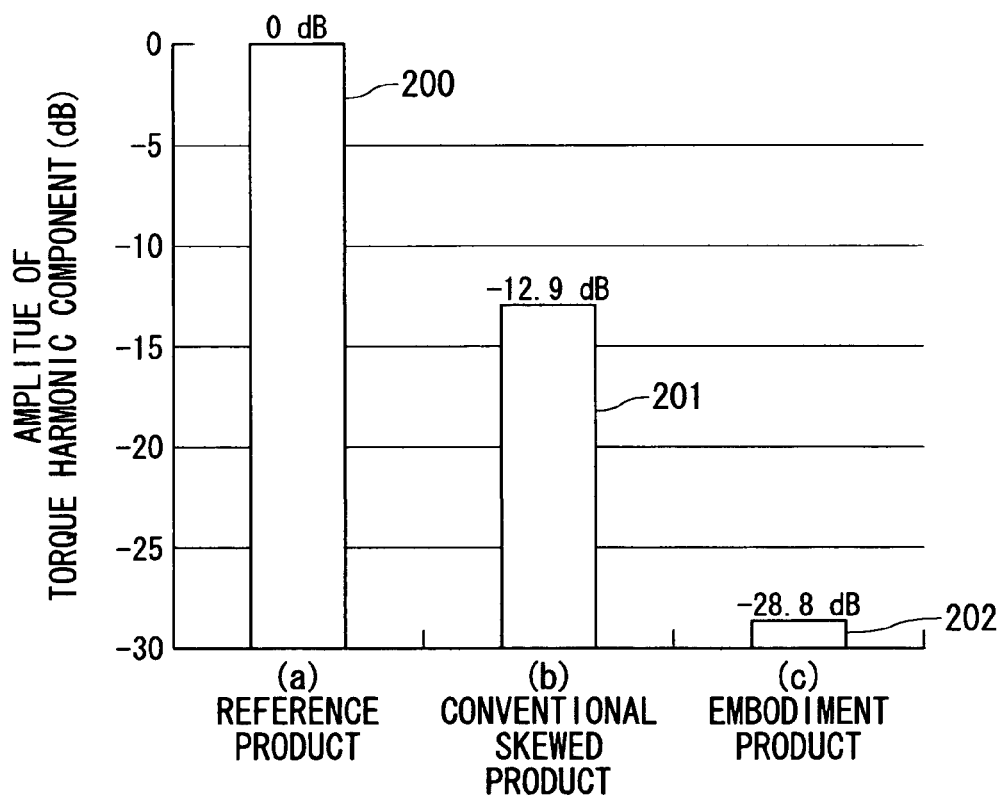
FIG. 14 shows relative comparisons among the torque harmonic component obtained from the various types of synchronous machines with IPM type of rotors.

Still FIG. 14 provides, in a comparative way, bar graphs 200, 201 and 202 showing the amplitudes of the harmonic components of torque generated in the reference product, in the conventional skewed product, and in the embodiment product, respectively. That is, the graph 200 for the reference product is shown as the basis for the other graphs 201 and 202 (that is, the torque harmonic component is 0 dB). When considering the reference product as the basis, the graphs 201 and 202 for the conventional skewed product and embodiment product show reductions in the torque harmonic component, which are −12.9 dB and −28.8 dB, respectively. Therefore, it is clear that the embodiment product is able to reduce the harmonic component no less than 16 dB, compared to the conventional skewed product.

The present embodiment provides another advantage as well. As shown in FIGS. 11 and 12, the first and second rotor members 21 and 22 are arranged to take positive and negative angular positions, respectively, under the condition where the rotor angular position "zero" corresponding to a zero of phase angle is between the first and second members 12 and 22. Owing to the fact that the phase angle "zero" is a phase angle at which the torque zero-th component (or even torque) takes a maximum, the first and second rotor members 21 and 22 undergo less reductions in the torque zero-th order component. As a result, there is an advantage that a decrease in the effective torque can be suppressed. Incidentally, as shown in FIG. 12, it is desired that a difference between the torque harmonic component at the "a" point and the torque zero-th component (or even torque) at the rotor angular position "zero" is equal to the torque harmonic component at the "b" point and the torque zero-th component (or even torque) at the rotor angular position "zero."

Sixth Modification

A sixth modification of the synchronous machine according to the present invention will now be described.

The sixth modification is characteristic of providing another way of adjusting the amounts of field.

In order to realize such an adjustment, in place of adjusting the axial lengths of the rotor members as explained in the first embodiment, the widths facing the circumference (refer to a reference "W" in FIG. 3) of the magnets 13 are adjusted to generate the amounts of field magnetic flux changed (adjusted) for every rotor member.

This configuration, however, will cause a change in reluctance torque, but can be compensated. Adjusting the amounts of field magnetic flux will involve changes in the torque, so that such a change in the reluctance torque can be absorbed, as long as the widths W of the magnets 13 are adjusted (changed) with due consideration of those changes in the reluctance torque. By way of example, the width W of each magnet 13 embedded in the first rotor member 21 is set to an appropriate width selected from a range of 25-75 percents of the width W of each magnet 12 embedded in the second rotor member 22.

Seventh Modification

A seventh modification of the rotary electric apparatus according to the present invention will now be described.

The seventh modification still provides another way of adjusting the amounts of field magnetic flux. Instead of adjusting the axial lengths of the rotor members as shown in the first embodiment, remanent flux densities of the magnets 13 are adjusted individually (differentiated from each other) to have the amounts of field magnetic flux changed (adjusted) for every rotor member. An example is that each magnet 13 embedded in the first rotor member 21 is less in the remanent flux density than each magnet 13 embedded in the second rotor member 22 by 25-75 percents.

Eight Modification

An eighth modification of the rotary electric apparatus according to the present invention will now be described.

The eighth modification still provides another way of adjusting the amounts of field magnetic flux. Instead of adjusting the axial lengths of the rotor members as shown in the first embodiment, amounts of short-circuiting magnetic flux in each magnet 13 embedded in the rotor are adjusted individually (differentiated from each other) to have the amounts of effective field magnetic flux changed (adjusted) for every rotor member. The "amount of short-circuiting magnetic flux in the rotor" is defined as an amount of field magnetic flux that passes along short-circuit magnetic paths within the rotor core. An example is that the amount of short-circuiting magnetic flux in the rotor can be increased such that the first rotor member 21 is less in the amount of effective field magnetic flux than the second rotor member 22 by 25-75 percents.

Ninth Modification

A ninth modification of the rotary electric apparatus according to the present invention will now be described.

This modification relates to which part of the apparatus is subjected to the arrangement of the skewed configuration. In the first embodiment, the skewed configuration is arranged between the first and second rotor members 21 and 22, but the skewed configuration can be placed on the stator side. An alternative is that the armature coils of the first stator member are twisted in the circumferential direction by an angle corresponding to the pitches of necessary slots between the first and second stator members 31 and 32, so that the stator core is skewed. The skewed configuration on the rotor side becomes equivalent to that on the rotor side. One advantage about this modification is therefore a decrease in the number of magnets into the rotor, whereby the steps of inserting the magnets into the rotor can be decreased.

Second Embodiment

Figure 15:
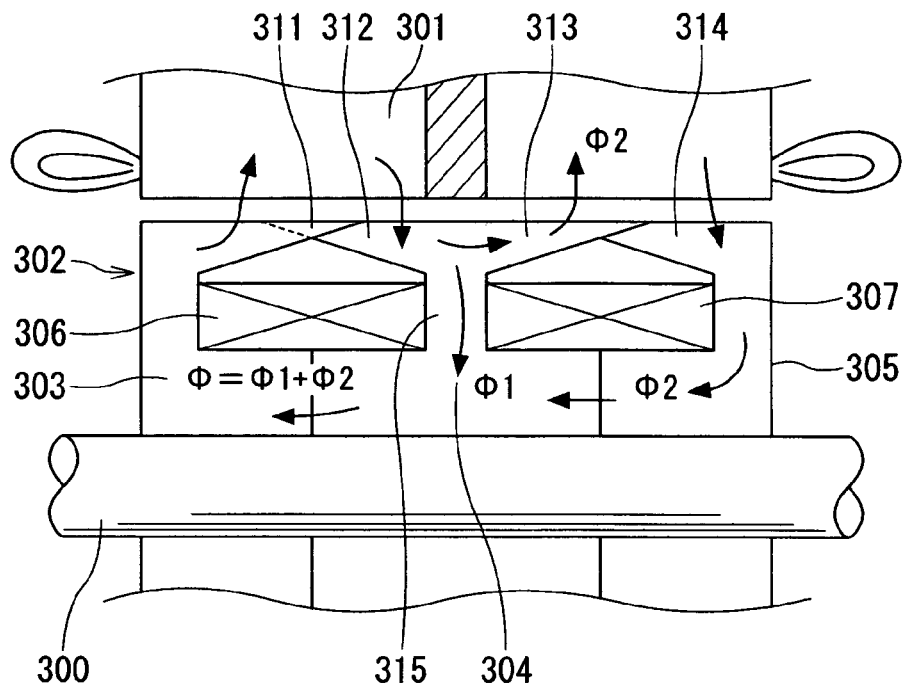
FIG. 15 is a partially sectioned view pictorially showing a field coil type of synchronous machine serving as the rotary electronic apparatus according to a second embodiment of the present invention.

Referring to FIG. 15, a second embodiment of the rotary electric apparatus according to the present invention will now be described.

For the sake of simplified explanations, in the second and subsequent embodiments, the components of this machine which are identical or similar to those in the foregoing first embodiment will be given the same reference numerals as those in the first embodiment, whereby the redundant explanations are omitted or shortened.

The present embodiment provides a three-phase AC generator motor which employs the first and second rotor members structured into Randell pole type.

As shown in FIG. 15, the generator has a rotation shaft 300, stator 301, and rotor 302. The rotor 302 is equipped with a rotor core composed of a first pole core 303, a second pole core 304, and a third pole core 305, a first field coil 306 wound in the rotor core so as to straddle both the first and second pole cores 303 and 304, and a second field coil 307 wound in the rotor core so as straddle both the second and third pole cores 304 and 305. Both the first and second field coils 306 and 307 are wound so that current flows along their coils in the same direction. The first pole core 303 has unguiform magnetic poles 311, the second pole core 304 has both unguiform magnetic poles 312 and 313 oriented in the mutually-opposite directions, and the third pole core 305 has unguiform magnetic poles 313.

Field magnetic flux Φ produced by the field coil 306 passes along a path compassing the unguiform magnetic poles 311, the stator 301, and the unguiform magnetic pole 312 in this order. After this path, part of the field magnetic flux Φ passes the unguiform magnetic pole 313 and the stator 301, and the unguiform magnetic pole 314, and returns to the original. The remainder of the field magnetic flux Φ, which has passed the unguiform magnetic pole 312 returns to the original via a pillar portion 315 radially extending in the second pole core 304.

In this rotor configuration, both the unguiform magnetic poles 311 and 312 constitute the second rotor member which is equivalent to the second rotor member 22 in the first embodiment, whilst both the unguiform magnetic poles 313 and 314 constitute the first rotor member equivalent to the first rotor member 21.

Since an amount of field magnetic flux flowing through the unguiform magnetic poles 313 and 314 (i.e., the first rotor member) is relatively less than that flowing through the unguiform magnetic poles 311 and 312 (i.e., the second rotor member), the axial length of the unguiform magnetic poles 313 and 314 is shortened less than that of the unguiform magnetic poles 311 and 312. Additionally, the unguiform magnetic poles 311 and 312 (the second rotor member) are skewed from the remaining unguiform magnetic poles 313 and 314 (the first rotor member) to a rotor angular position corresponding to the foregoing phase angle θ.

Hence the above skewed configuration is also able to provide a reduction in a torque harmonic component, like the first embodiment. An additional advantage is given, which is able to shorten the axial length of the pillar portion 315 of the second pole core 304, due to the fact that the amount of field magnetic flux passing the pillar portion is lowered.

Third embodiment

Figure 16:
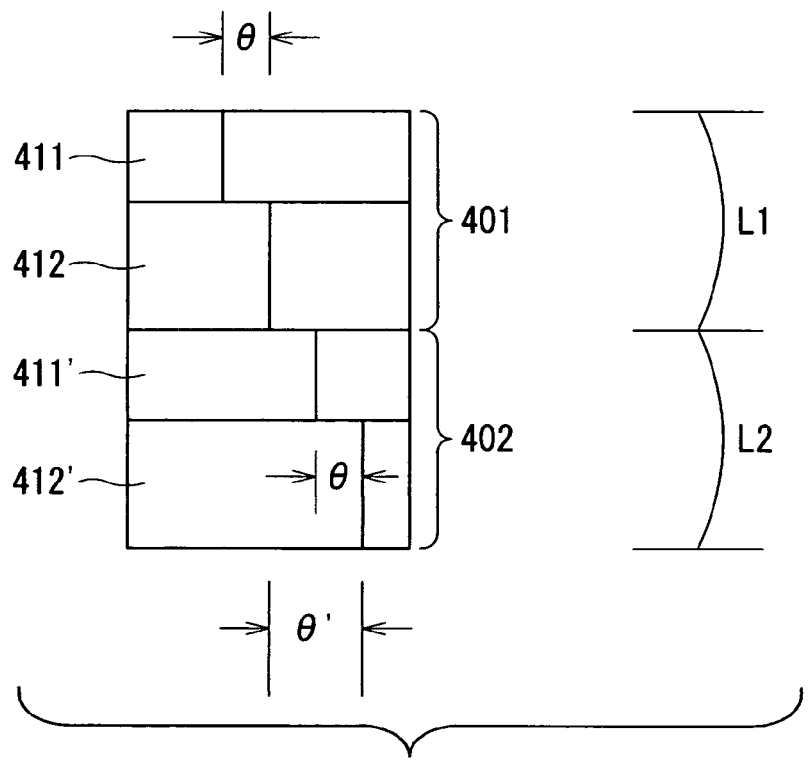
FIG. 16 pictorially explains a rotor of a synchronous machine serving as the rotary electronic machine according to a third embodiment of the present invention.

Referring to FIG. 16, a third embodiment of the rotary electric apparatus according to the present invention will now be described.

The present invention is concerned with a double skewing structure of two rotor member groups 401 and 402. As shown in FIG. 16, the first rotor member group 401 is composed of a first rotor member 411 and a second rotor member 412 and the second rotor member group 402 is composed of a first rotor member 411' and a second rotor member 412'. The first rotor member group is skewed from the second rotor member group 402 by a predetermined phase angle θ' in the circumferential direction. In addition, in the first rotor member group 401, the first rotor member 411 is skewed from the second rotor member 412 by a phase angle θ, and, similarly to this, in the second rotor member group 402, the first rotor member 411' is skewed from the second rotor member 412' by a phase angle θ.

Hence, in each of the first and second rotor member groups 401 and 402, a torque harmonic component (e.g., the sixth-order component) of which half-wavelength corresponds to the phase angle θ is reduced.

In addition to this advantage, there is provided a further advantage that comes from the skew configuration of a predetermined skew angle θ in the circumferential direction arranged between the first and second rotor member groups 401 and 402. That is, a torque harmonic component (e.g., the twelfth component) whose half-wavelength corresponds to the phase angle θ' can be reduced as well.

Like the forgoing embodiments, the rotor configuration according to the present embodiment employs the individually adjusted axial-length configuration of the rotor members. Specifically, the axial lengths of the first and second rotor member groups 401 and 402 are changed (adjusted) from each other to adjust the amounts of field magnetic flux so that the maximum amplitudes of the torque harmonic components with respect to those rotor member groups are made consistent with each other.

By the way, the foregoing embodiments and modifications thereof have been described about the cancellation of the torque components (i.e., the circumferential components of the electromagnetic force), but this is not a definitive list. Alternatively, the cancellation scheme in accordance with the present invention may be applied to the radical component of the electromagnetic force or to a combination of the radial and circumferential components of the electromagnetic force.

Various features of the foregoing embodiments and modifications, which correspond to the present invention, will now be summarized.

In the skew arrangement, a combined electromagnetic force ΣF calculated by combining electromagnetic-force harmonic components F1 and F2 caused by a pair consisting of the first rotor member and the first stator member a further pair consisting of the second rotor member and the second stator member is set to an amount less than half a combined electromagnetic force to be obtained on condition that the skewing structure is formed for Φ1=Φ2. Thus, compared to the conventional, it is possible to further reduce a torque harmonic component. Preferably, the combined electromagnetic force ΣF is set to an amount less than quarter of the combined electromagnetic force to be obtained on condition that the skewing structure is formed for Φ1=Φ2. The torque harmonic component can be reduced more. It is also preferred that the combined electromagnetic force ΣF is set to be zero or approximately zero. Therefore, the torque harmonic component of a predetermined order is almost cancelled out. In this configuration, the "zero or approximately zero" includes a value falling into a range form −5% to +5% of the torque harmonic component of the predetermined order of one rotor member.

Further, the harmonic component F1 is different in electrical angle than the harmonic component F2 by a phase of 180 degrees or thereabouts (in the embodiment, 175-185 degrees). The torque harmonic components can be cancelled out well.

Still further, the rotor is composed of a magnet type of rotor provided with magnets generating the field magnetic flux, both the skewing structure and the control means being arranged with the rotor. And the first rotor member is different in axial length from the second rotor member. This enables amounts of field magnetic flux from the both rotor members can be changed easily in a controlled manner. It is therefore possible to well change (adjust) the maximum amplitude of a torque harmonic component which is a value of a function whose variable is a field magnetic flux amount.

By way of example, the first rotor member is shorter in the axial length than the second rotor member by 25 to 75 percents of the axial length of the second rotor member. In general, the ratio of the maximum amplitude of a torque harmonic component which is from the first rotor member to that from the second rotor member, which is due to the skew arrangement, is generally within this range of the axial length. Thus a difference between maximum amplitudes of torque harmonic components, which results from the skew arrangement, can be compensated surely.

It is preferred that the axial length of the first rotor is set to a length which equals 25, 50 or 75% of the axial length of the second rotor member. This is helpful in preparing the magnets to be embedded in the first and second rotor members. That is, it is sufficient when only one kind of magnet is prepared. For example, for 50% of the axial length of the second member, one magnet is inserted into each axial hole of the first rotor member, while two magnets are inserted in series into each axial hole of the second rotor member; for 25% of the axial length of the second member, one magnet is inserted into each axial hole of the first rotor member, while four magnets are inserted in series into each axial hole of the second rotor member; and for 75% of the axial length of the second member, three magnet is inserted into each axial hole of the first rotor member, while four magnets are inserted in series into each axial hole of the second rotor member.

In addition, in the case of 50%, serially arranging the second, first and second rotor members in this order in the axial direction and inserting one magnet into each hole of each rotor member, the unbalance(torsion) of torque of the entire rotor in the axial direction can be lessened.

Distributing the axial length into 25, 50 or 75% will not limit the concept of the division employed in the present invention. Based on this concept, the rotor can be divided into an arbitrary number of rotor members to be assembled into the first and second rotor members of a predetermined axial-length ratio, each hole of each of the first and second rotor members is loaded with a single magnet.

It is also preferred that the first and second rotor members are composed of magnet type of rotors, respectively, and the width of each rotor embedded in the first rotor member is different from that in the second rotor member. The width is defined as a width of a surface of each magnet, the surface being almost along the circumference of the rotor. Therefore, changing such widths of the magnets also leads to changes in the amounts of field magnetic flux, providing the same advantage as that obtained by changing the foregoing axial lengths of the magnets (that is, each rotor member). In this case, an example is that the width of each magnet embedded in the first rotor member is smaller than that of each magnet embedded in the second rotor member by 25-75 percents. Thus a torque harmonic component can be reduced further.

Another preferred configuration with regard to the changes in the amounts of field magnetic flux is to differentiate the first and second rotors in magnet flux density. By this configuration, the amounts of field magnetic flux between the first and second rotors can be differentiated from each other, whatever types of magnets whose magnetic poles are the same in area. A preferable example is that the magnet flux density of the first rotor is 25-75 percents. Thus a torque harmonic component can be reduced surely.

It is also preferred to give the first rotor member an amount of rotor short-circuiting magnetic flux which is different from that of second rotor. In the IPM type of rotor, part of the magnet flux is short-circuited within the rotor so that the short-circuited flux becomes reactive magnetic flux. There is no interlinkage between the reactive magnetic flux and armature current. Changing this short-circuited amount in a controlled manner also results in the same operation and advantages as the above.

Furthermore, if taking the reference rotor position as a phase of zero, setting can be made such that the phase angle θ1 at the first rotor member has a negative value and the phase angle θ2 at the second rotor member has a positive value. This is effective in reducing the phase shifts of both the rotor members from the phase angle of zero, resulting in that changes in the torque of both the rotors, which are measured based on the phase angel of zero at which the torque zero-th component becomes maximum. This suppresses a reduction in active torque.

The amounts of the magnetic flux can be controlled such that an absolute value of a difference between a maximum amplitude of a torque harmonic component of a predetermined order at the reference angular position of the rotor and a maximum amplitude of the torque harmonic component of the predetermined order of the first rotor member is substantially equal to each other to a difference between the maximum amplitude of the torque harmonic component of the predetermined order at the reference angular position of the rotor and a maximum amplitude of the torque harmonic component of the predetermined order of the second rotor member. Thus, imbalance of torque zero-th order components at respective portions of the rotor can be decreased. Concurrently, an even torque zero-th order component can be magnified. Incidentally, this kind of control for the phase angles can easily be established by holding, at given angles, the phases of armature current to be measured from the first and/or second rotor members.

In addition, the rotor may be a field coil type of rotor having both the first rotor member and the second rotor member mutually adjacent in the axial direction and the first rotor member has unguiform magnetic poles and the second rotor member has unguiform magnetic poles, the unguiform magnetic poles of both the first and second rotor members being protruded from the same yoke portion and being positionally shifted from each other in the circumferential direction. The same advantage as the forgoing can also be given to the Randell pole type of machine.

In this structure, the unguiform magnetic poles of both the first and second rotor members are polarized differently. This polarized structure allows the field magnetic flux to pass along the magnetic path illustrated in FIG. 15, so that the rotor core can be made compact.

Furthermore, as described, the magnetically separated space having a predetermined axial length is placed between the first and second rotor members. This reduces the short-circuited magnetic flux between the first and second rotor members, thereby reducing a distortion in the distribution of the field magnetic flux, thereby reducing a torque harmonic component resultant the distortion. The magnetically separated space may be a mere air gap or may be composed of a non-magnetic member.

With regard to the arrangement order of the first and second rotors, there can be provided further modifications. The second rotor member may be divided into two members arranged in the axial direction with the first rotor member therebetween. This is effective in decreasing the unbalance of torque distributions along the axial direction, thus being effective in suppressing the rotation shaft from being twisted. Each of the first and second rotor members may be divided into plural members and the members of both the first and second rotor members are arranged alternatively in the axial direction. This is also effective for preventing the rotation shaft from being twisted.

Further, in the electric apparatus, the armature current is controlled such that an absolute value of a difference between a maximum amplitude of a torque harmonic component of a predetermined order at the reference angular position of the rotor and a maximum amplitude of a torque harmonic component of the predetermined order caused by the first rotor member is substantially equal to an absolute value of a difference between a maximum amplitude of a torque harmonic component of the predetermined order at the reference angular position of the rotor and a maximum amplitude of a torque harmonic component of the predetermined order caused by the second rotor member. Thus, imbalance of torque zero-th order components at respective portions of the rotor can be decreased. Concurrently, an even torque zero-th order component can be magnified.

The present invention may be embodied in several other forms without departing from the spirit thereof. The foregoing embodiments and modifications thereof as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A rotary electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is equipped with armature coils through which armature current is supplied for synchronous rotation between the rotor and the stator;

a skewing structure mutually skewing the first rotor member and the second rotor member such that a first phase angle θ1 of the magnetic flux generated by the first rotor member differs from a phase angle θ2 of the magnetic flux generated by the second rotor member, the first phase angle θ1 and the second phase angle θ2 being based on a reference angular position of the rotor providing a maximum of a zero-th component of torque caused in response to the armature current to be supplied in the stator; and a control structure that controls each of an amount Φ1 of the magnetic flux generated by the first rotor member and an amount Φ2 of the magnetic flux generated by the second rotor member such that the amounts Φ1 and Φ2 differ from each other so as to reduce a difference between a maximum amplitude of a predetermined-order harmonic component F1 of an electromagnetic force caused by a pair consisting of the first rotor member and the first stator member and a further maximum amplitude of the predetermined-order harmonic component F2 of an electromagnetic force caused by a further pair consisting of the second rotor member and the second stator member, wherein the rotor is composed of a magnet type of rotor provided with magnets generating the field magnetic flux, both the skewing structure and the control structure being arranged with the rotor, each magnet has a plate-like shape and is embedded in the rotor along the axial direction of the rotor having a cylindrical surface facing the stator, and the first rotor member is different in a width of each magnet from the second rotor member, the width of each magnet being defined as a width of a surface of each magnet, the surface facing a cylindrical surface of the rotor.

2. The rotary electric apparatus according to claim 1, wherein each magnet embedded in the first rotor member is smaller in the width than each magnet embedded in the second rotor member by 25 to 75 percent of the width of each magnet embedded in the second rotor member.

3. A rotary electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is equipped with armature coils through which armature current is supplied for synchronous rotation between the rotor and the stator;

a skewing structure mutually skewing the first rotor member and the second rotor member such that a first phase angle θ1 of the magnetic flux generated by the first rotor member differs from a phase angle θ2 of the magnetic flux generated by the second rotor member, the first phase angle θ1 and the second phase angle θ2 being based on a reference angular position of the rotor providing a maximum of a zero-th component of torque caused in response to the armature current to be supplied in the stator; and a control structure that controls each of an amount Φ1 of the magnetic flux generated by the first rotor member and an amount Φ2 of the magnetic flux generated by the second rotor member such that the amounts Φ1 and Φ2 differ from each other so as to reduce a difference between a maximum amplitude of a predetermined-order harmonic component F1 of an electromagnetic force caused by a pair consisting of the first rotor member and the first stator member and a further maximum amplitude of the predetermined-order harmonic component F2 of an electromagnetic force caused by a further pair consisting of the second rotor member and the second stator member, wherein the rotor is composed of a magnet type of rotor provided with magnets generating the field magnetic flux, both the skewing structure and the control structure being arranged with the rotor, and each magnet embedded in the first rotor member is different in magnetic flux density from each magnet embedded in the second rotor member.

4. The rotary electric apparatus according to claim 3, wherein each magnet embedded in the first rotor member is smaller in the magnetic flux density than each magnet embedded in the second rotor member by 25 to 75 percent of the magnetic flux density of each magnet embedded in the second rotor member.

5. A rotary electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is equipped with armature coils through which armature current is supplied for synchronous rotation between the rotor and the stator;

a skewing structure mutually skewing the first rotor member and the second rotor member such that a first phase angle θ1 of the magnetic flux generated by the first rotor member differs from a phase angle θ2 of the magnetic flux generated by the second rotor member, the first phase angle θ1 and the second chase angle θ2 being based on a reference angular position of the rotor providing a maximum of a zero-th component of torque caused in response to the armature current to be supplied in the stator; and a control structure that controls each of an amount Φ1 of the magnetic flux generated by the first rotor member and an amount Φ2 of the magnetic flux generated by the second rotor member such that the amounts Φ1 and Φ2 differ from each other so as to reduce a difference between a maximum amplitude of a predetermined-order harmonic component F1 of an electromagnetic force caused by a pair consisting of the first rotor member and the first stator member and a further maximum amplitude of the predetermined-order harmonic component F2 of an electromagnetic force caused by a further pair consisting of the second rotor member and the second stator member, wherein the rotor is composed of a magnet type of rotor provided with magnets generating the field magnetic flux, both the skewing structure and the control structure being arranged with the rotor, and each magnet embedded in the first rotor member is different in an amount of rotor short-circuiting magnetic flux from each magnet embedded in the second rotor member.

6. A rotary electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is equipped with armature coils through which armature current is supplied for synchronous rotation between the rotor and the stator;

a skewing structure mutually skewing the first rotor member and the second rotor member such that a first phase angle θ1 of the magnetic flux generated by the first rotor member differs from a phase angle θ2 of the magnetic flux generated by the second rotor member, the first phase angle θ1 and the second phase angle θ2 being based on a reference angular position of the rotor providing a maximum of a zero-th component of torque caused in response to the armature current to be supplied in the stator; and a control structure that controls each of an amount Φ1 of the magnetic flux generated by the first rotor member and an amount Φ2 of the magnetic flux generated by the second rotor member such that the amounts Φ1 and Φ2 differ from each other so as to reduce a difference between a maximum amplitude of a predetermined-order harmonic component F1 of an electromagnetic force caused by a pair consisting of the first rotor member and the first stator member and a further maximum amplitude of the predetermined-order harmonic component F2 of an electromagnetic force caused by a further pair consisting of the second rotor member and the second stator member, wherein the rotor is composed of a magnet type of rotor provided with magnets generating the field magnetic flux, both the skewing structure and the control structure being arranged with the rotor, the first rotor member is set to have a phase angle θ1 that is a negative value and the second rotor member is set to have a phase angle θ2 that is a positive value, on condition that the reference angular position of the rotor is given a phase angle of zero, and the control structure is configured to control the amounts Φ1 and Φ2 of the magnetic flux such that an absolute value equal to a difference between a maximum amplitude of a torque harmonic component of a predetermined order at the reference angular position of the rotor and a maximum amplitude of the torque harmonic component of the predetermined order of the first rotor member is substantially equal to a difference between the maximum amplitude of the torque harmonic component of the predetermined order at the reference angular position of the rotor and a maximum amplitude of the torque harmonic component of the predetermined order of the second rotor member.

7. A rotary electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is eguipped with armature coils through which armature current is supplied for synchronous rotation between the rotor and the stator;

a skewing structure mutually skewing the first rotor member and the second rotor member such that a first phase angle θ1 of the magnetic flux generated by the first rotor member differs from a phase angle θ2 of the magnetic flux generated by the second rotor member, the first phase angle θ1 and the second phase angle θ2 being based on a reference angular position of the rotor providing a maximum of a zero-th comnonent of torque caused in response to the armature current to be supplied in the stator; and a control structure that controls each of an amount Φ1 of the magnetic flux generated by the first rotor member and an amount Φ2 of the magnetic flux generated by the second rotor member such that the amounts Φ1 and Φ2 differ from each other so as to reduce a difference between a maximum amplitude of a predetermined-order harmonic component F1 of an electromagnetic force caused by a pair consisting of the first rotor member and the first stator member and a further maximum amplitude of the predetermined-order harmonic component F2 of an electromagnetic force caused by a further pair consisting of the second rotor member and the second stator member, wherein the rotor is composed of a field coil type of rotor having both the first rotor member and the second rotor member mutually adjacent in the axial direction and each of the first rotor member and the second rotor member has a Lundell pole structure, the Lundell pole structures of both the first and second rotor members being positionally shifted from each other in a circumferential direction of both the rotor members.

8. The rotary electric apparatus according to claim 7, wherein the Lundell pole structures of both the first and second rotor members have magnetic poles polarized differently from each other.

9. An electric apparatus, comprising:

a rotation shaft having an axial direction about which the rotation shaft rotates;

a rotor including a first rotor member and a second rotor member each generating magnetic flux providing a field and being secured at different positions along the axial direction of the rotation shaft;

a stator facing the rotor with a predetermined-size air gap therebetween and including a first stator member and a second stator member each of which is equipped with armature coils through which armature current is supplied for synchronous rotation between the rotor and the stator; and a current controller controlling the armature current, wherein either the rotor or stator is subjected to a skew arrangement in which a first phase angle θ1 of the magnetic flux generated by the first rotor member is skewed from a phase angle θ2 of the magnetic flux generated by the second rotor member, the first phase angle θ1 and the second phase angle θ2 being based on a reference angular position of the rotor providing a maximum of a zero-th component of torque caused in response to the armature current to be supplied in the stator, and wherein the current controller is configured to control the armature current such that, in cases where it is assumed that a phase angle of either the first or second rotor member measured at an amount of the armature current at which torque becomes a maximum thereof is zero, a phase angle θ1 of the magnetic flux generated by the first rotor member has a negative value thereof and a phase angle θ2 of the magnetic flux generated by the second rotor member has a positive value thereof.

10. The electric apparatus according to claim 9, wherein the current controller is configured to control the armature current such that an absolute value of a difference between a maximum amplitude of a torque harmonic component of a predetermined order at the reference angular position of the rotor and a maximum amplitude of a torque harmonic component of the predetermined order caused by the first rotor member is substantially equal to an absolute value of a difference between a maximum amplitude of a torque harmonic component of the predetermined order at the reference angular position of the rotor and a maximum amplitude of a torque harmonic component of the predetermined order caused by the second rotor member.

* * * * *